(12) United States Patent
Shiga

(10) Patent No.: US 11,501,801 B2
(45) Date of Patent: Nov. 15, 2022

(54) VIDEO EDITING SYSTEM AND VIDEO EDITING METHOD

(71) Applicant: Tsukasa Shiga, Tokyo (JP)

(72) Inventor: Tsukasa Shiga, Tokyo (JP)

(73) Assignee: Tsukasa Shiga, Tokyo (JP)

( * ) Notice: Subject to any disclaimer, the term of this patent is extended or adjusted under 35 U.S.C. 154(b) by 63 days.

(21) Appl. No.: 17/122,336

(22) Filed: Dec. 15, 2020

(65) Prior Publication Data

US 2021/0193181 A1    Jun. 24, 2021

(30) Foreign Application Priority Data

Dec. 19, 2019   (JP) ............................. JP2019-229470

(51) Int. Cl.
  *G11B 27/02*    (2006.01)
  *H04N 21/858*   (2011.01)
  *H04N 21/845*   (2011.01)

(52) U.S. Cl.
  CPC ........... *G11B 27/02* (2013.01); *H04N 21/845* (2013.01); *H04N 21/858* (2013.01)

(58) Field of Classification Search
  CPC .......... H04N 21/84; H04N 21/85; G06F 3/00; G11B 27/02
  See application file for complete search history.

(56) References Cited

U.S. PATENT DOCUMENTS

| | | | |
|---|---|---|---|
| 2003/0025726 A1* | 2/2003 | Yamamoto | H04N 5/772 386/E5.072 |
| 2005/0151743 A1* | 7/2005 | Sitrick | H04N 5/272 345/670 |
| 2005/0225566 A1* | 10/2005 | Kojo | H04N 5/272 348/E5.058 |
| 2012/0096356 A1* | 4/2012 | Ubillos | G11B 27/034 715/723 |
| 2016/0232578 A1* | 8/2016 | Jung | H04W 4/80 |

FOREIGN PATENT DOCUMENTS

| | | |
|---|---|---|
| JP | 2004-266789 A | 9/2004 |
| JP | 2016-154021 A | 8/2016 |

* cited by examiner

*Primary Examiner* — Jennifer N Welch
*Assistant Examiner* — Qi Wan
(74) *Attorney, Agent, or Firm* — Michael Best & Friedrich LLP

(57) ABSTRACT

A video editing system capable of quickly providing video that an original appears and reducing a workload on a service manager. The video editing system edits multiple pieces of video including original video that a cast oneself appears and substitute video in chronological order to generate complete video. Specifically, the video editing system acquires cast attribute data indicating a cast attribute, acquires original video data indicating the original video shot by a shooting apparatus, and selects substitute video data in a predetermined shooting pattern from multiple shooting patterns based on the cast attribute indicated by the cast attribute data. Moreover, the video editing system edits the original video indicated by the original video data and the substitute video indicated by the selected substitute video data in chronological order to generate complete video data indicating the complete video.

3 Claims, 11 Drawing Sheets

<VIDEO EDITING SYSTEM S>

<CAST ATTRIBUTE DATA>

EXPERIENCE APPLICATION

START TIME: 10 A.M. ON DECEMBER 24, 2019

| ID | 0001 |
|---|---|
| NAME | ABC |
| NATIONALITY | * * * |
| AGE | 30 |
| PICTURE |  |
| GENDER | MALE |
| BODY TYPE | NORMAL |
| COSTUME SIZE | M |
| COSTUME | NINJA A/BLACK |
| . . . | . . . . . . . |

FIG. 5

<SUBSTITUTE VIDEO REFERENCE DATA>

| SUBSTITUTE VIDEO | SHOOTING SCENE | GENDER | BODY TYPE | COSTUME SIZE | COSTUME |
|---|---|---|---|---|---|
| 1-1 | SUBSTITUTE SHOOTING SCENE1 | MALE | THIN | S | NINJA A/BLACK |
| 1-2 | | | | | NINJA A/WHITE |
| 1-3 | | | | | NINJA B/BLACK |
| 1-4 | | | | | NINJA B/WHITE |
| 1-5 | | | NORMAL | M | NINJA A/BLACK |
| 1-6 | | | | | NINJA A/WHITE |
| 1-7 | | | | | NINJA B/BLACK |
| 1-8 | | | | | NINJA B/WHITE |
| 1-9 | | | LARGE | L | NINJA A/BLACK |
| 1-10 | | | | | NINJA A/WHITE |
| 1-11 | | | | | NINJA B/BLACK |
| 1-12 | | | | | NINJA B/WHITE |
| 1-13 | | FEMALE | THIN | S | KUNOICHI A |
| 1-14 | | | | | KUNOICHI B |
| 1-15 | | | NORMAL | M | KUNOICHI A |
| | | | | | KUNOICHI B |
| | | | | L | KUNOICHI |

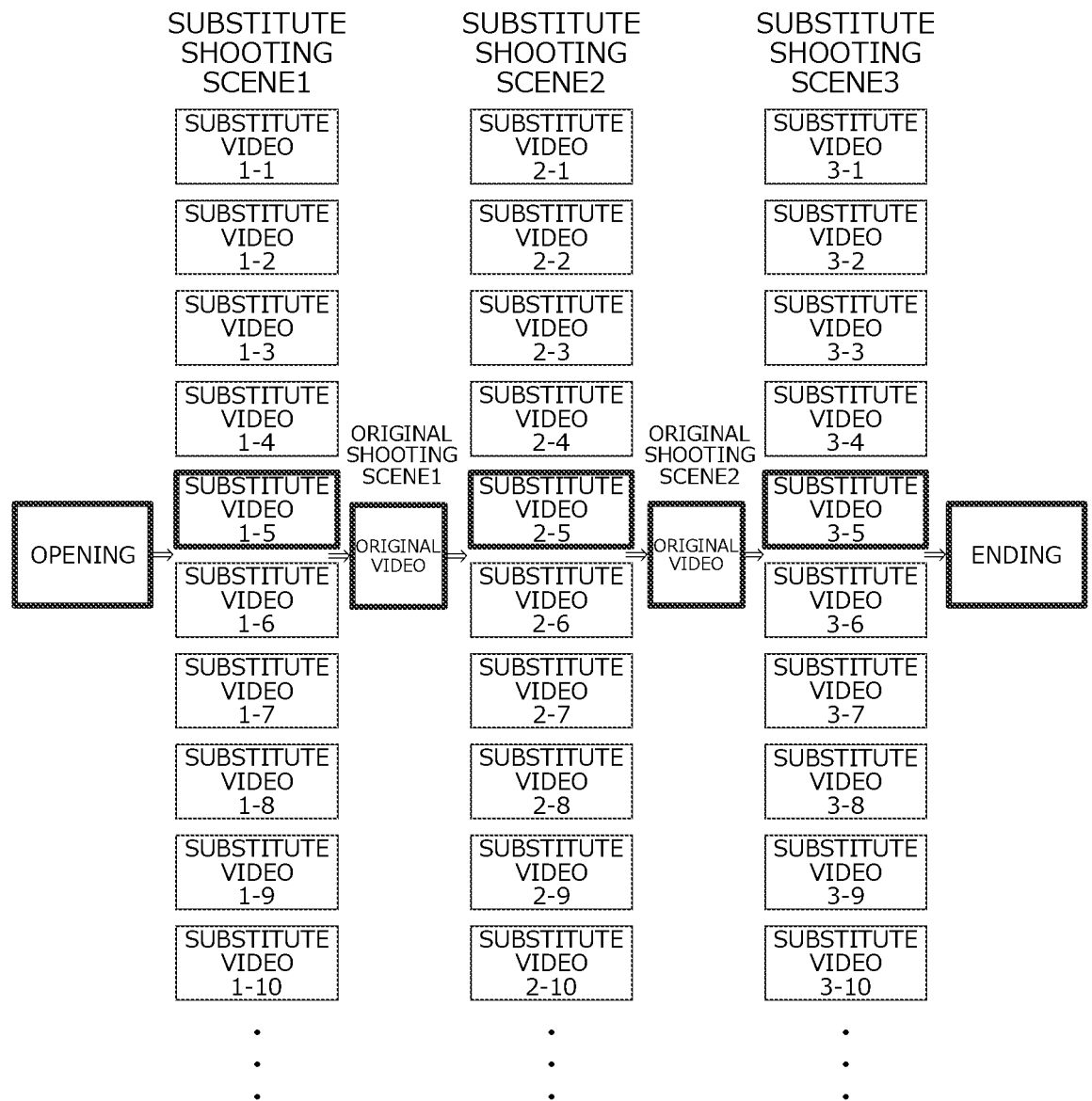

<SUBSTITUTE VIDEO (SUBSTITUTE SHOOTING SCENE 1)>

<ORIGINAL VIDEO (ORIGINAL SHOOTING SCENE 1)>

ORIGINAL

<ORIGINAL VIDEO (ORIGINAL SHOOTING SCENE 2)>

ORIGINAL

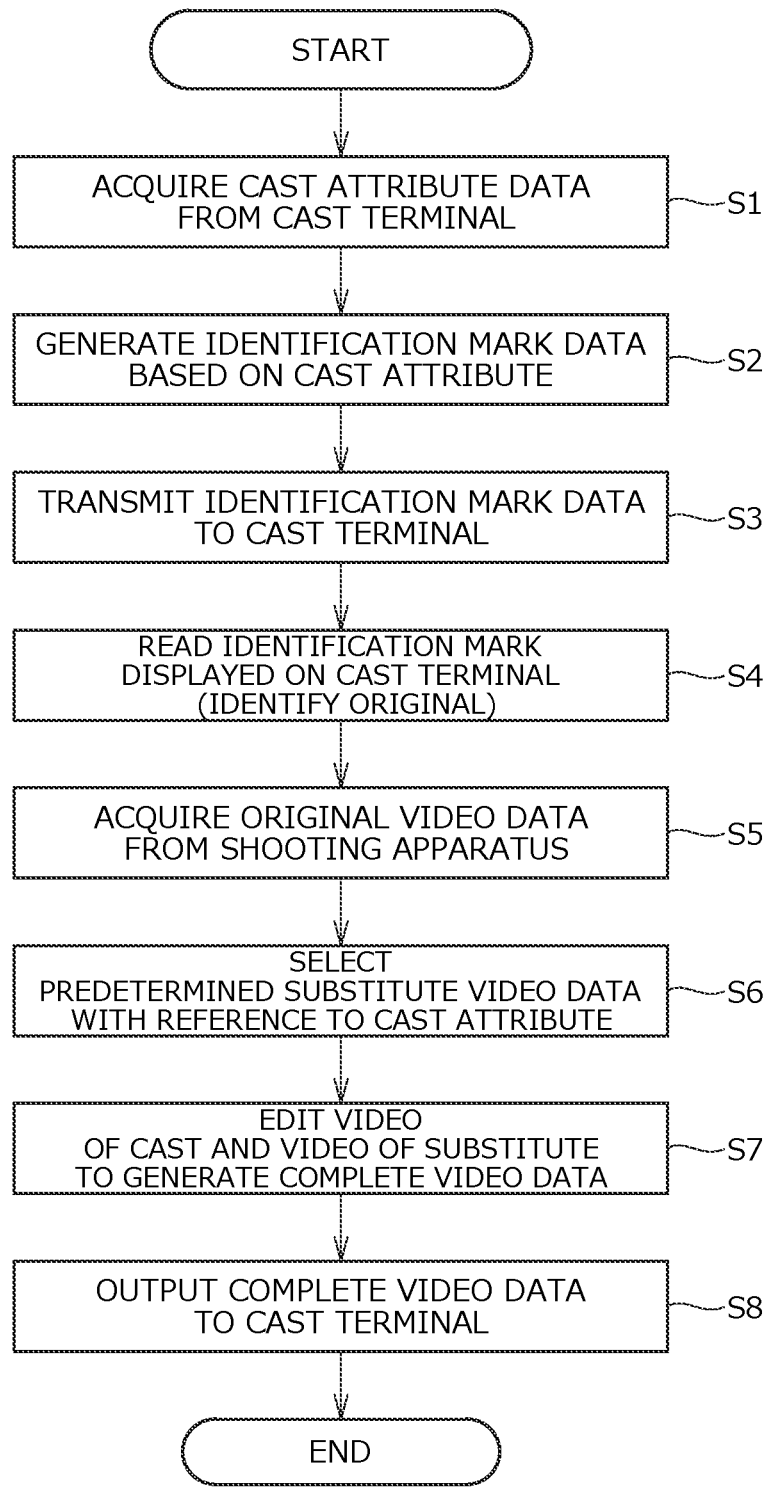

VIDEO EDITING SYSTEM AND VIDEO EDITING METHOD

CROSS REFERENCE TO RELATED APPLICATIONS

This application is based upon and claims the priority benefit of Japanese Patent Application No. JP 2019-229470, filed Dec. 19, 2019, the contents being incorporated herein by reference.

FIELD

The present disclosure relates to a video editing system and a video editing method. Particularly, the present disclosure relates to a video editing system and a video editing method for editing multiple pieces of video including original video of a cast oneself and substitute video in chronological order to generate complete video.

BACKGROUND

In recent years, experience-based services providing various experience-based events to consumers in various experience-based facilities have drawn attention.

Particularly, as an experience-based service for an inbound visitor, a service that a foreign tourist can wear a costume or clothes of a character (e.g., a ninja, a samurai, or a cartoon character) representing Japan and can act like such a character to experience the Japanese culture has been popular.

In such an experience-based service, a service for providing a memorial picture or a memorial moving image of an experience-based event to an experience target has been also provided so that the experience target can leave with memories.

In such a video-providing service, it is easier for the experience target to leave with the memorial moving image as the memories than the memorial picture. However, quick creation and provision of the memorial moving image for the experience target places a great workload on a service manager and leads to a high working cost.

For example, JP 2004-266789A (the "'789 Reference") discloses that a wedding movie can be easily edited in a movie editing service.

Specifically, a story is, as a bride's and groom's history until a wedding, created in advance by combination of "existing video" and "newly-shot video," and is temporarily edited with an effect such as music being added to the story. On the day of a wedding ceremony, the story is edited by a computer to include video obtained by shooting of the actual wedding ceremony, and complete video is played at a reception right after the wedding ceremony.

Such a system utilizes the bride's and groom's "existing video," and therefore, all shooting scenes are not necessarily shot and edited on the day of the wedding ceremony, and the workload on the service manager can be reduced to a certain extent.

Moreover, JP 2016-154021A ("'021 Reference") discloses a moving image providing system in which a memorial moving image can be easily provided to a guest at an event such as a wedding reception.

Specifically, "moving image data" uploaded from a shooting apparatus is stored in a storage apparatus in association with a combination of an event ID and a user ID, and the "moving image data" and "existing background image data" are synthesized to generate synthetic moving image data. Then, when an access to a management server is made from a user mobile terminal, the synthetic moving image data corresponding to the combination of the event ID and the user ID is provided to the user mobile terminal.

However, the video editing system as in the '789 Reference and the '021 Reference creates the memorial moving image by combining the "existing video" of the user oneself and the "new video" of the user oneself to quickly provide the memorial moving image to the user and reduce the workload on the service manager. However, such a system cannot be applied to experience-based services other than the wedding ceremony.

That is, in a case where many foreign tourists join the experience-based event all day long in the experience-based service for the inbound visitor, the process of obtaining "original video data" of each foreign tourist in advance can never be performed, and the process of processing the "original video data" to finish a memorial moving image that the foreign tourist wears a character costume can never be performed.

SUMMARY

The present disclosure has been made in view of the above-described problems, and an object of the present disclosure is to provide a video editing system and a video editing method capable of quickly providing video that an original appears and reducing a workload on a service manager.

Particularly, an object is to provide a video editing system and a video editing method capable of quickly providing video that an original acts like a character in an experience-based service for an inbound visitor and reducing a workload on a service manager.

According to the video editing system of embodiments disclosed herein, the above-described problems are solved by a video editing system for editing multiple pieces of video including original video that a cast oneself appears and substitute video that a substitute for the cast appears in chronological order to generate complete video. The video editing system includes an attribute data acquisition unit configured to acquire cast attribute data indicating a cast attribute necessary for appearance of the cast, a video data acquisition unit configured to acquire original video data indicating the shot original video of the cast, a video data selection unit configured to select substitute video data in a predetermined shooting pattern from multiple shooting patterns based on the cast attribute indicated by the cast attribute data, and a video data generation unit configured to edit the original video indicated by the original video data and the substitute video indicated by the selected substitute video data in chronological order to generate complete video data indicating the complete video.

With the above-described configuration, the video editing system capable of quickly providing the video that the original appears in various experience-based services and reducing the workload on the service manager can be implemented.

Specifically, the newly-shot "original video of the cast" and the "substitute video" in the predetermined shooting pattern selected based on the cast attribute can be edited to generate the complete video. Thus, the original video (precisely, the original video including the substitute video) can be quickly provided, and the working load on the service manager and a working cost of the service manager can be reduced.

Note that the "substitute video" is selected based on the cast attribute, and therefore, the complete video can be finished with such a degree of completion that a third person cannot recognize that the substitute video has been utilized.

The video editing system may further include a storage unit configured to store the substitute video data indicating the pre-shot substitute video in the multiple shooting patterns. The storage unit may store the substitute video data in the multiple shooting patterns according to a difference in at least one attribute item of the gender of the cast, the body type of the cast, or the costume of the cast, and the video data selection unit may select, from the multiple shooting patterns, the substitute video data in a shooting pattern corresponding to the attribute item of the cast.

With the above-described configuration, the pre-shot "substitute video" is stored in the multiple patterns, and is selected based on the difference in at least one attribute item of the gender of the cast, the body type of the cast, or the costume of the cast. Thus, the complete video can be generated with a higher degree of completion.

The video editing system editing the original video that the cast plays a character and the substitute video that the substitute for the cast plays the character in chronological order may further include a shooting apparatus configured to shoot the original video of the cast to generate the original video data. The shooting apparatus may shoot, as the original video in the complete video, a shooting scene that the face of the cast oneself is seen.

With the above-described configuration, the video editing system capable of quickly providing the video that the original acts like the character and reducing the workload on the service manager can be implemented particularly in the experience-based service for an inbound visitor.

Moreover, the shooting apparatus shoots, as the original video, the shooting scene that the face of the cast is seen in the complete video, and therefore, the complete video can be generated with a higher degree of completion.

The attribute data acquisition unit may acquire the cast attribute data from a cast terminal utilized by the cast, and the video editing system further may include a mark data generation unit configured to generate, from the cast attribute indicated by the acquired cast attribute data, identification mark data indicating an identification mark for identifying the cast, a data transmission unit configured to transmit the generated identification mark data to the cast terminal, an original confirmation unit configured to read the identification mark displayed on the cast terminal to confirm the cast oneself, and a video data output unit configured to output the complete video data to the cast terminal.

With the above-described configuration, the service for smooth "reception and check-in" and "provision of the complete video" for the cast can be provided by a simple management method utilizing the identification mark.

Moreover, the identification mark is utilized so that, e.g., "reception of a pre-shooting lecture class" and "reception for studio shooting" after reception and check-in and "checking of the returned costume" after the end of shooting can be managed.

The video editing system may further include a shooting apparatus configured to shoot the original video of the cast in multiple shooting scenes, and a data linking unit configured to read the identification mark indicated by the identification mark data in shooing of the original video to link the cast attribute recorded in the identification mark and the original video of the cast to each other. The video data acquisition unit may acquire multiple pieces of original video data linked to the cast attribute.

With the above-described configuration, even in a case where the original video of the cast is shot in the multiple shooting scenes, the multiple pieces of original video can be simply and properly managed.

A video editing method for editing multiple pieces of video including original video that a cast oneself appears and substitute video that a substitute for the cast appears in chronological order to generate complete video can be also implemented. The video editing method includes executing, by a computer, the attribute data acquisition step of acquiring cast attribute data including a cast attribute necessary for appearance of the cast, the video data acquisition step of acquiring original video data indicating the shot original video of the cast, the video data selection step of selecting substitute video data in a predetermined shooting pattern from multiple shooting patterns based on the cast attribute indicated by the cast attribute data, and the video data generation step of editing the cast original video indicated by the original video data and the substitute video indicated by the selected substitute video data in chronological order to generate complete video data indicating the complete video.

BRIEF DESCRIPTION OF DRAWINGS

Various embodiments are illustrated in the drawings, in which:

FIG. 5 is a view of one example of substitute video reference data;

FIG. 6 is a view for describing one example of video data selection processing and video data generation processing;

FIG. 10 is a processing flowchart of one example of a video editing method according to an embodiment.

DETAILED DESCRIPTION

Hereinafter, embodiments are described with reference to FIGS. 1 to 10. The present embodiment relates to the technique of a video editing system for editing multiple pieces of video including original video that a cast oneself appears and substitute video that a substitute for the cast appears in chronological order to generate complete video. The video editing system includes a storage unit configured to store "substitute video data" indicating pre-shot substitute video in the multiple shooting patterns, an attribute data acquisition unit configured to acquire "cast attribute data" indicating a cast attribute necessary for appearance of the cast, a video data acquisition unit configured to acquire "original video data" indicating the shot original video, a video data selection unit configured to select the substitute video data in a predetermined shooting pattern from multiple shooting patterns based on the cast attribute indicated by the cast attribute data, and a video data generation unit configured to edit the original video indicated by the original video data and the substitute video indicated by the selected substitute video data in chronological order to generate "complete video data" indicating the complete video.

Figure 1:
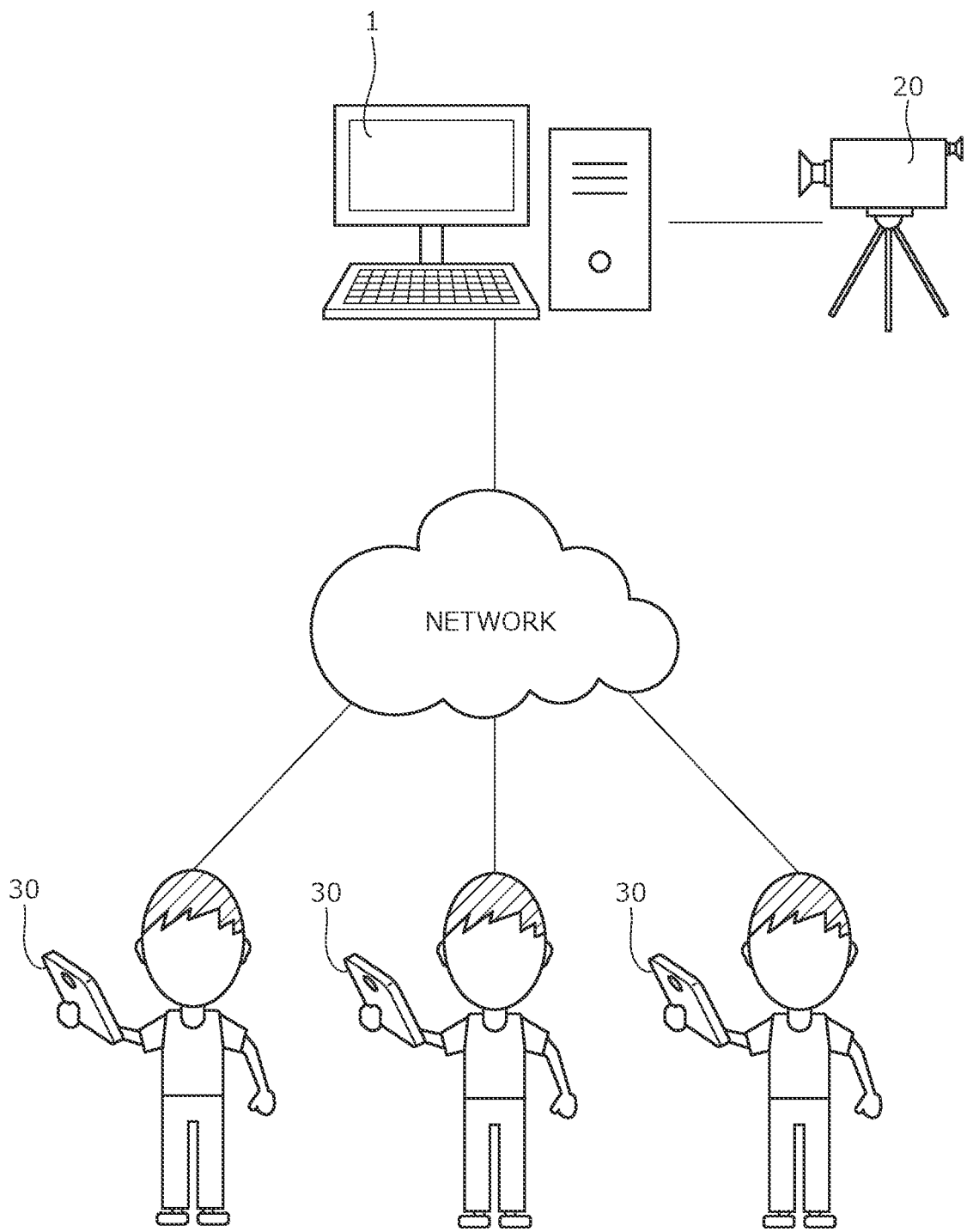
FIG. 1 is a configuration diagram of a video editing system according to an embodiment.

The entire configuration of a video editing system S according to an embodiment is illustrated in FIG. 1.

The video editing system S is a system configured to edit "original video" that a cast plays various characters and "substitute video" that a substitute for the cast appears in chronological order to generate "complete video" as a memorial moving image and provide the complete video to the cast.

Specifically, the video editing system S is a system configured to quickly provide, to an experience target, the "complete video" including the "original video" that the experience target oneself acts like various characters in an experience-based service for an inbound visitor.

"Various characters" described herein include characters representing Japan, such as characters including a ninja, a samurai, a prince, and a princess and Japanese cartoon characters.

Hereinafter, description is made in the present embodiment, assuming that the cast oneself wears a "ninja" costume and plays a ninja.

The video editing system S mainly includes a video editing apparatus 1, a shooting apparatus 20 connected to the video editing apparatus 1 and configured to shoot the original video, and cast terminals 30 connected to the video editing apparatus 1 via a network and utilized by casts.

Figure 2:
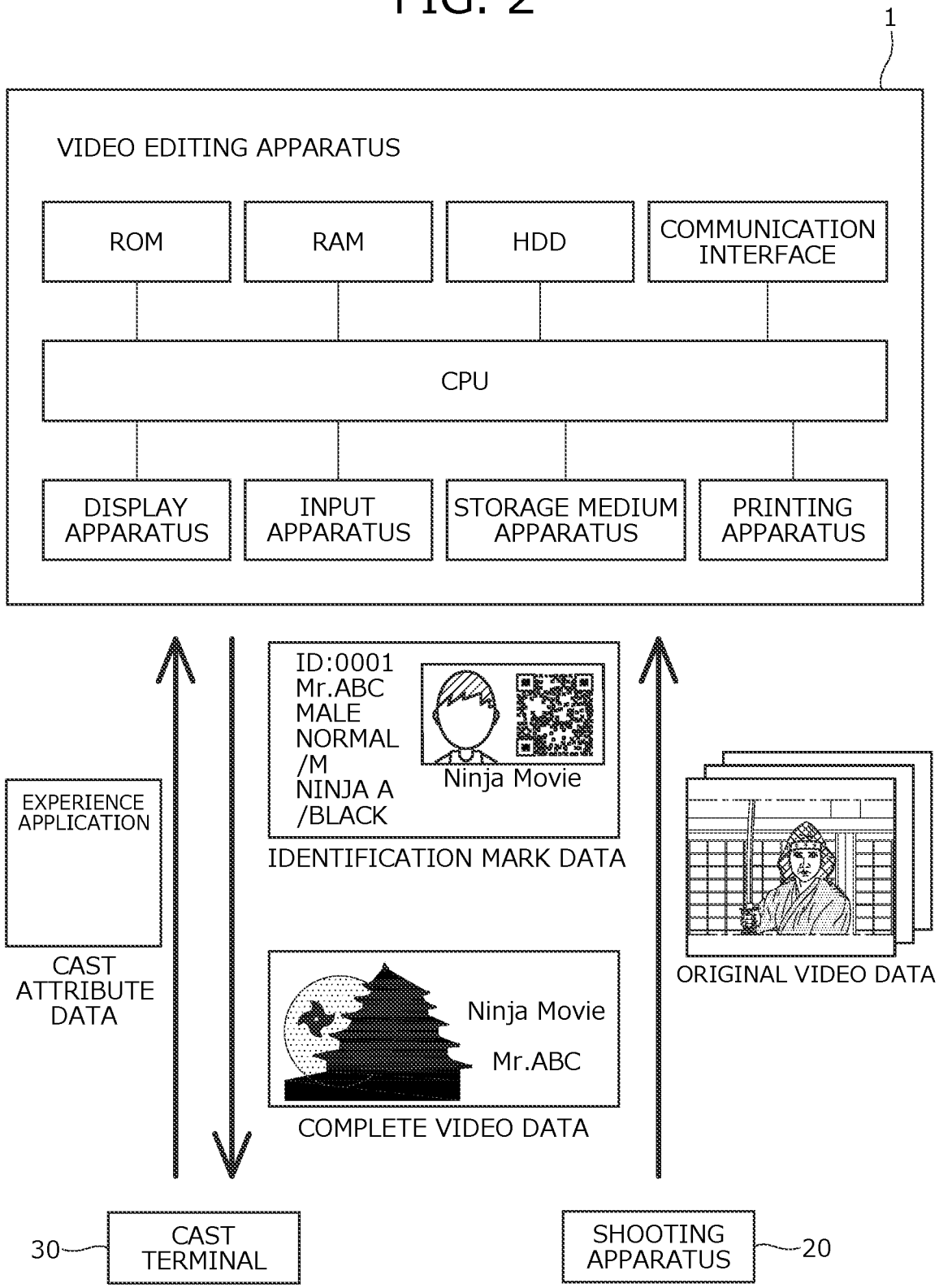
FIG. 2 is a hardware configuration diagram of the video editing system.

As illustrated in FIGS. 1 and 2, the video editing apparatus 1 is a computer configured to perform data communication with the shooting apparatus 20 and the cast terminals 30, and provides a software service regarding admission management for the casts and provision of the complete video.

Specifically, the video editing apparatus 1 acquires "cast attribute data" indicating the attribute of the cast from the cast terminal 30 to generate "identification mark data" indicating an identification mark of the cast, and transmits the "identification mark data" to the cast terminal 30. Then, the video editing apparatus 1 reads the identification mark displayed on the cast terminal 30 to confirm the cast oneself. Then, the video editing apparatus 1 acquires "original video data" indicating the original video shot by the shooting apparatus 20, and edits such original video and the substitute video selected based on the cast attribute in chronological order to generate "complete video data" indicating the complete video. Then, the video editing apparatus 1 outputs the "complete video data" to the cast terminal 30.

Note that the video editing apparatus 1 stores multiple patterns of "substitute video data" indicating the pre-shot substitute video.

The shooting apparatus 20 is a shooting camera, and shoots the original video in multiple shooting scenes to generate the "original video data" in each shooting scene.

Specifically, multiple shooting apparatuses 20 are placed at locations where each shooting scene can be shot in an experience-based facility reminiscent of a ninja mansion, generate multiple pieces of "original video data" linked to the cast attribute, and transmits such data to the video editing apparatus 1.

The cast terminal 30 is an information terminal to be operated by the cast, and is specifically a computer such as a P-smartphone, a tablet terminal, or a PC.

The cast terminal 30 is connected to the video editing apparatus 1 via the network, and receives the software service provided from the video editing apparatus 1.

Specifically, the cast terminal 30 receives input or selection of experience-based event application information from the cast, transmits the "cast attribute data" to the video editing apparatus 1, and receives the "identification mark data" for identifying the cast from the video editing apparatus 1. Then, on the day of the experience, the identification mark is displayed on a display unit of the cast terminal 30 for smoothly performing, e.g., processing from cast's reception and check-in to reception for studio shooting. Then, after the end of the experience, the cast terminal 30 receives the "complete video data" from the video editing apparatus 1.

Hardware Configuration of Video Editing System

As illustrated in FIG. 2, the video editing apparatus 1 is a computer having a CPU as a data arithmetic control processing apparatus, a ROM, a RAM, and an HDD (SSD) as storage apparatuses, and a communication interface configured to transmit/receive information data via a home network or the Internet.

Moreover, the video editing apparatus 1 further has a display apparatus configured to display character or image information displayed in a predetermined format, an input apparatus to be input-operated when a predetermined command is input to the CPU, a storage medium apparatus such as an external hard disk, and a printing apparatus configured to output the character or image information.

Note that the shooting apparatus 20 and the cast terminal 30 also include similar hardware configurations.

Figure 3:
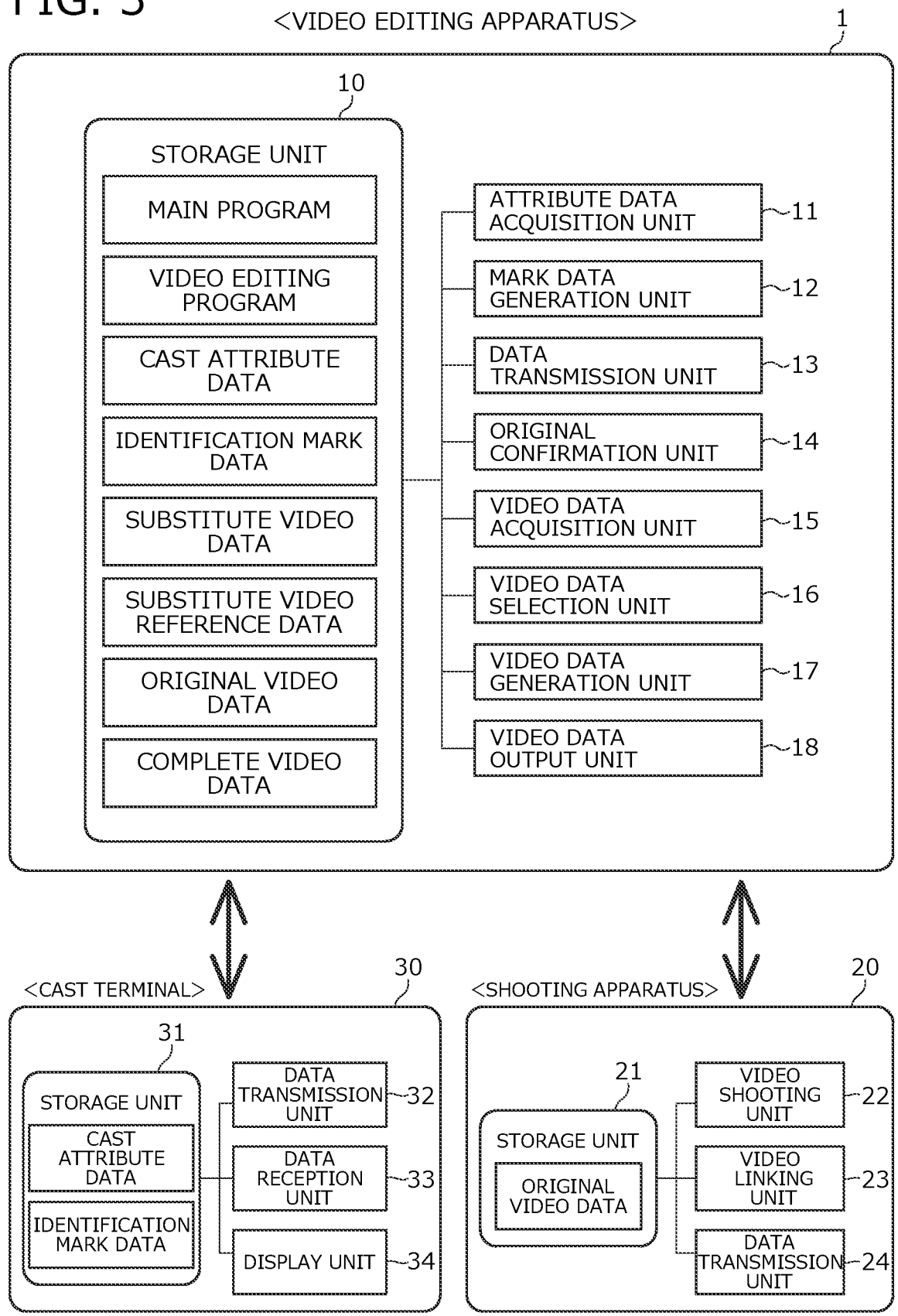
FIG. 3 is a software configuration diagram of the video editing system.

As illustrated in FIG. 3, the ROM, the HDD, and the external storage apparatus of the video editing apparatus 1 store a video editing program in addition to a main program fulfilling a function necessary for the computer, and these programs are executed by the CPU to fulfill the functions of the video editing apparatus 1.

Software Configuration of Video Editing System

From a functional aspect, the video editing apparatus 1 includes, as main components, a storage unit 10 configured to store various programs and various types of data in addition to the "cast attribute data," the "identification mark data," the "substitute video data," the "substitute video reference data," the "original video data," and the "complete video data," an attribute data acquisition unit 11, a mark data generation unit 12, a data transmission unit 13, an original confirmation unit 14, a video data acquisition unit 15, a video data selection unit 16, a video data generation unit 17, and a video data output unit 18, as illustrated in FIG. 3.

These components include, for example, CPUs, ROMs, RAMs, HDDs, communication interfaces, and various programs.

The shooting apparatus 20 includes, as main components, a storage unit 21 configured to store various programs (various types of data), a video shooting unit 22 configured to shoot the original video in the multiple shooting scenes, a video linking unit 23 configured to read the identification mark indicated by the "identification mark data" in advance in shooting of the original video to link the cast attribute included in the identification mark and the original video to each other, and a data transmission unit 24 configured to generate multiple pieces of "original video data" linked to the cast attribute to transmit the "original video data" to the video editing apparatus 1.

The cast terminal 30 includes, as main components, a storage unit 31 configured to store various programs (various types of data), a data transmission unit 32 configured to receive the input operation or the selection operation from the cast to transmit the "cast attribute data" to the video editing apparatus 1, a data reception unit 33 configured to receive the "identification mark data" and the "complete video data" from the video editing apparatus 1, and a display unit 34 configured to display the identification mark indicated by the "identification mark data."

Figure 4:
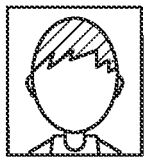
FIG. 4 is a view of one example of cast attribute data.

As illustrated in FIGS. 2 and 4, the "cast attribute data" stored in the storage unit 10 is data indicating the cast attribute necessary for appearance of the cast, and is transmitted from the cast terminal 30 and is unified and stored in the storage unit 10.

With reference to the cast attribute data, the function of generating the "identification mark data" indicating the identification mark of the cast can be utilized.

Specifically, the cast attribute data mainly includes information on the "ID," "name," "nationality," "age," "picture," "gender," "body type," "costume size," and "costume" of the cast.

The embodiment of FIG. 4 shows that information such as the ID "0001," gender "male," body type "normal," costume size "M," and costume "ninja A/black" of the cast is set and the photographic data of the cast oneself is attached.

The "body type" described herein is, for example, set from three types of "thin," "normal," and "large" by the cast as necessary. Alternatively, the video editing apparatus 1 may set the "body type" as necessary in response to information on a body height, a body weight, a bust, a waist, a hip, and a shoe size by the cast's input operation.

The "costume size" is set as necessary by the cast within a range from a small size "S" to a large size "L," for example.

For the "costume," in the case of, e.g., a male, the cast can select the costume as necessary from costumes of "ninja A" and "ninja B" types, and can select a color from the "black" and the "white." In the case of a female, the cast can select the costume as necessary from costumes of "kunoichi A" and "kunoichi B" types.

As illustrated in FIG. 2, the "identification mark data" is data indicating the identification mark for identifying the cast, and is generated by the video editing apparatus 1 and is transmitted to the cast terminal 30.

With reference to such identification mark data, the function of displaying the identification mark on the display unit 34 by the cast terminal 30 can be utilized.

Specifically, the identification mark data includes, in addition to the "identification mark," information on the "ID," the "name," the "gender," the "body type," the "costume size," the "costume," and the "picture" as cast identification contents.

The "identification mark" described herein is, for example, a two-dimensional bar code, and is a mark for optically reading the above-described cast identification contents.

The "substitute video data" is moving image data indicating the pre-shot substitute video, and is unified and stored in the storage unit 10 according to multiple shooting patterns and the multiple shooting scenes.

The substitute video data is stored in the storage unit 10 in the multiple shooting patterns according to a difference in cast attribute items. Specifically, the substitute video data is stored in the multiple shooting patterns according to a difference in the "gender," "body type," "costume size," and "costume" of the cast.

Note that the substitute video data is not particularly limited to the above-described cast attribute items, and for example, may be stored in the multiple shooting patterns according to a difference in the "nationality" and "age" of the cast. Alternatively, the substitute video data may be stored in the multiple shooting patterns according to a difference in information obtained from the "picture" of the cast.

Figure 7A:
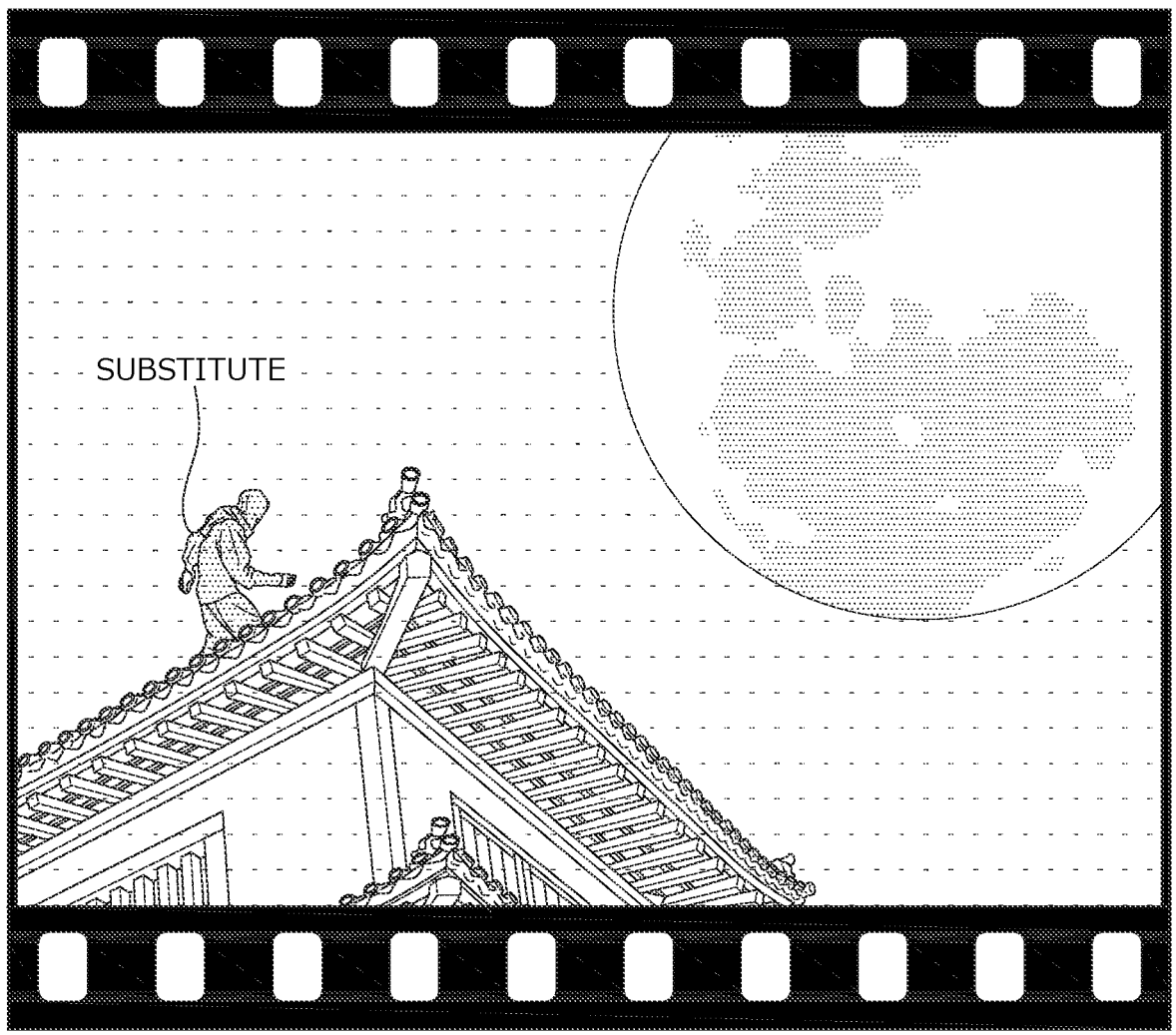
FIG. 7A is a view of one example of substitute video (a substitute shooting scene 1)
Figure 7B:
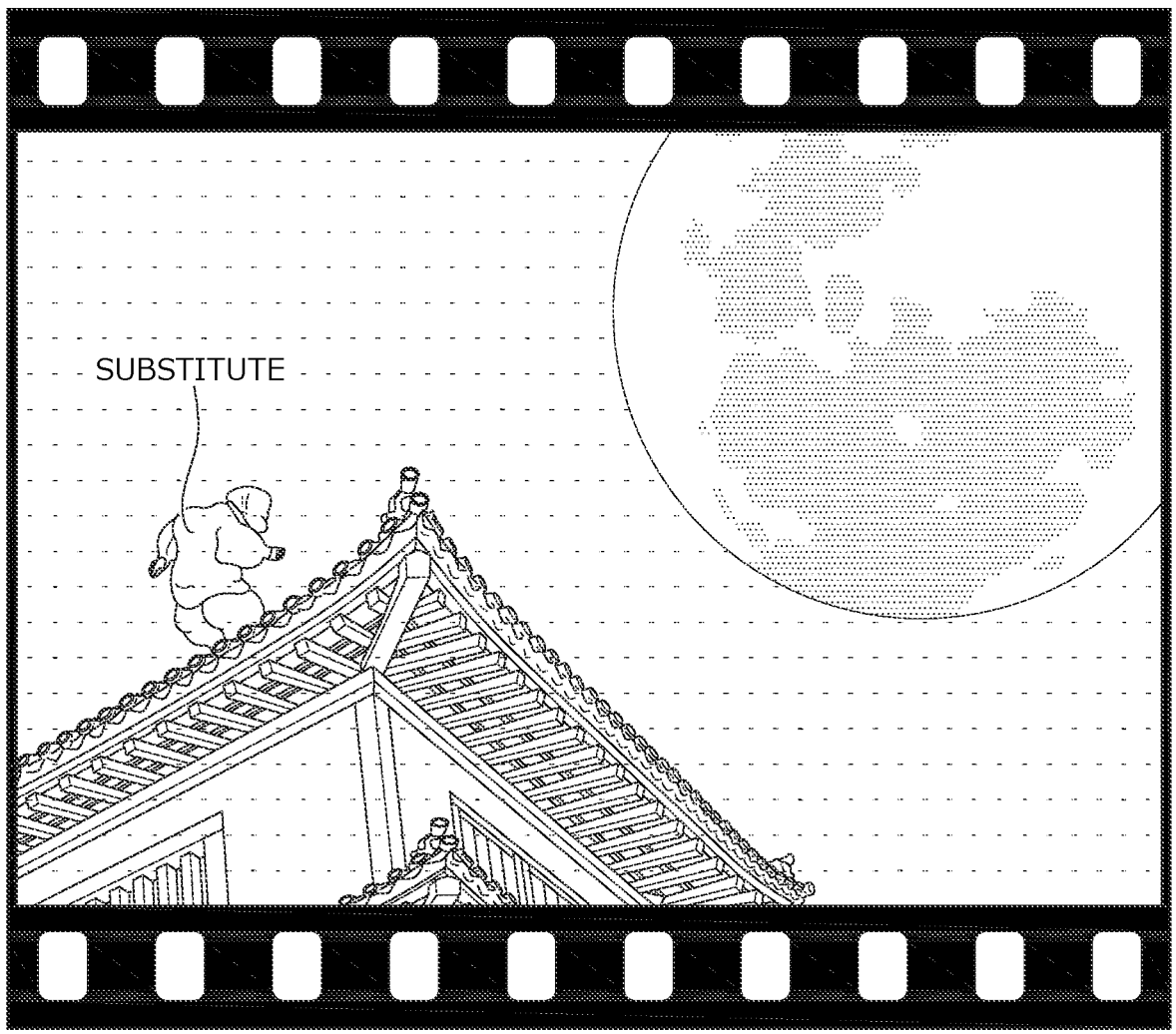
FIG. 7B is a view of one example of the substitute video (the substitute shooting scene 1)

The embodiment of FIG. 7A shows that a shooting scene that the face of the cast cannot be seen is employed as the substitute video in the complete video. Moreover, FIGS. 7A and 7B show that the multiple shooting patterns according to a difference in the "body type" and the "costume" are stored.

As illustrated in FIG. 5, the "substitute video reference data" is table data indicating a correspondence between the substitute video and the cast attribute item, and is unified and stored in the storage unit 10.

With reference to such substitute video reference data, the function of selecting the substitute video data in the shooting pattern corresponding to the cast attribute items from the multiple shooting patterns can be utilized.

Specifically, in the substitute video reference data, information on the "shooting scene" and the "gender," "body type," "costume size," and "costume" of the cast is assigned to each piece of substitute video.

The embodiment of FIG. 5 shows that the shooting scene "substitute shooting scene 1," the gender "male," the body type "thin," the costume size "S," and the costume "ninja A/black" are assigned to the substitute video 1-1.

The "original video data" is moving image data indicating the original video shot by the shooting apparatus 20, and is unified and stored in the storage unit 10 according to the multiple shooting scenes.

Specifically, the original video data is moving image data linked to the cast attribute (specifically, the ID of the cast), and for each cast, is managed and stored for each of the multiple shooting scenes.

Figure 8:
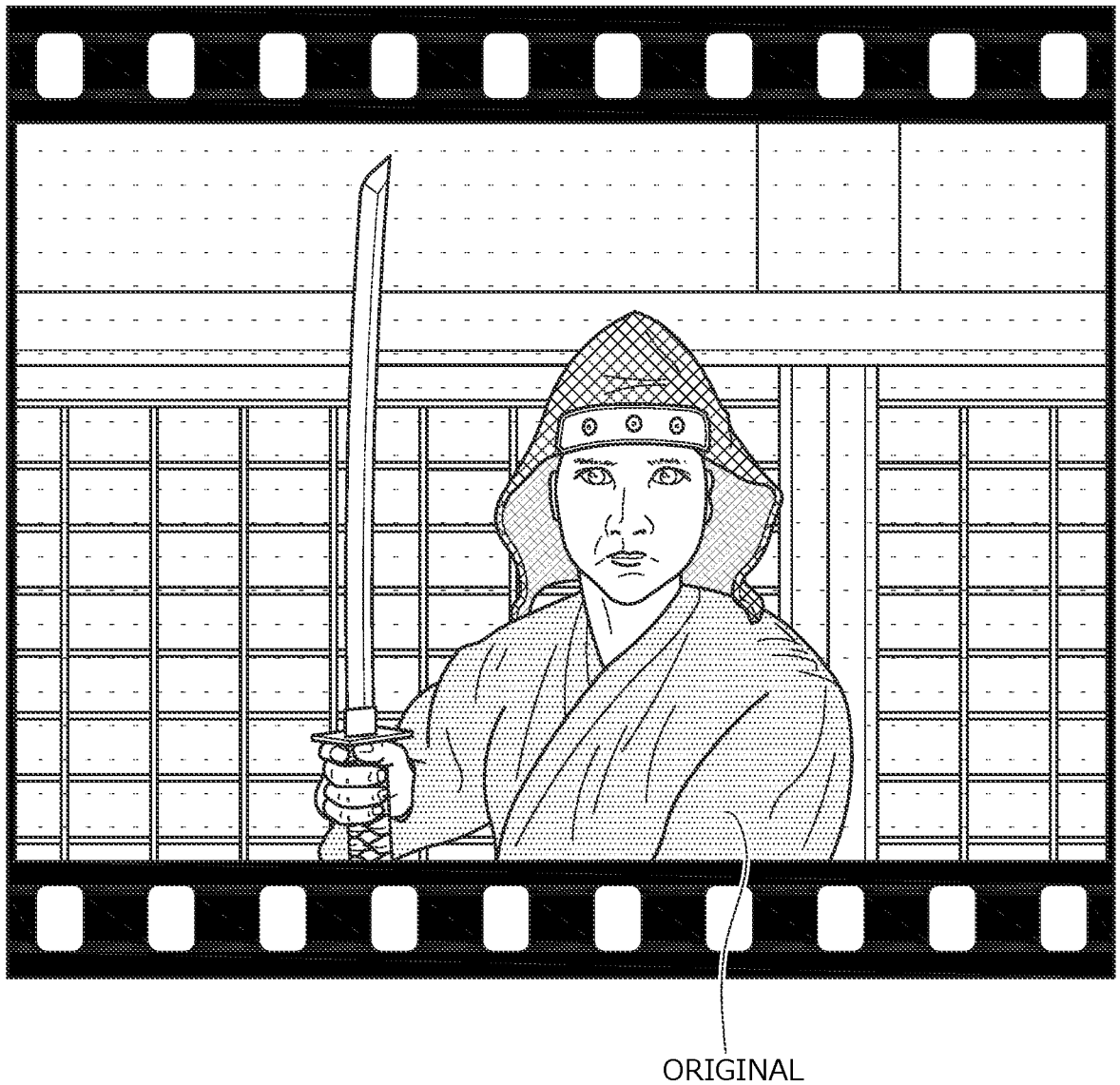
FIG. 8 is a view of one example of original video (an original shooting scene 1)

The embodiment of FIG. 8 shows that a shooting scene that the face of the cast can be seen is employed as the original video in the complete video.

Figure 9:
FIG. 9 is a view of one example of the original video (an original shooting scene)

Moreover, the embodiment of FIG. 9 shows that a shooting scene (specifically, the scene of a swordfight with a rival ninja) unique to the ninja is employed as the original video in the complete video.

The "complete video data" is moving image data indicating the complete video obtained by editing the original video and the selected substitute video in chronological order, and is generated by the video editing apparatus 1 and is transmitted to the cast terminal 30.

Specifically, as illustrated in FIG. 6, the complete video data is moving image data indicating the complete video including an "opening," the "substitute shooting scene 1," an "original shooting scene 1, a "substitute shooting scene 2," an "original shooting scene 2," a "substitute shooting scene 3," and an "ending." Moreover, the complete video data is moving image data linked to the cast attribute.

The attribute data acquisition unit 11 acquires the "cast attribute data" from the cast terminal 30 utilized by the cast, and such cast attribute data is sorted according to each cast and is stored in the storage unit 10.

The mark data generation unit 12 generates the "identification mark data" with reference to the cast attribute indicated by the "cast attribute data," and such identification mark data is sorted according to each cast and is stored in the storage unit 10.

The data transmission unit 13 transmits the "identification mark data" to the cast terminal 30. At this point, the cast terminal 30 (the data reception unit 33) receives the "identification mark data" from the video editing apparatus 1, and the identification mark data is stored in the storage unit 31.

The original confirmation unit 14 reads the identification mark displayed on the cast terminal 30 to confirm that a user of the cast terminal 30 is the cast oneself.

Specifically, a not-shown camera connected to the video editing apparatus 1 reads the identification mark, and the original confirmation unit 14 checks, from the cast identification contents included in the identification mark, whether or not the user is the cast oneself The video data acquisition unit 15 acquires the "original video data" linked to the cast attribute from the shooting apparatus 20, and such original video data is, for each cast, sorted according to each shooting scene and is stored in the storage unit 10.

Note that the video linking unit 23 of the shooting apparatus 20 reads, in shooting of the original video, the identification mark indicated by the "identification mark data" in advance to link the cast attribute recorded in the identification mark and the original video to each other.

The video data selection unit 16 selects, with reference to the cast attribute indicated by the "cast attribute data," the "substitute video data" in a predetermined shooting pattern from the multiple shooting patterns.

Specifically, the video data selection unit 16 selects, for each shooting scene, the "substitute video data" in the shooting pattern corresponding to the cast attribute items from the multiple shooting patterns, as illustrated in FIG. 6.

The video data generation unit 17 edits the original video indicated by the "original video data" and the substitute video indicated by the selected "substitute video data" in chronological order to generate the "complete video data" indicating the complete video.

Specifically, as illustrated in FIG. 6, the video data generation unit 17 edits the starting video "opening," the original video "original shooting scenes 1, 2," the selected substitute video "substitute shooting scenes 1, 2, 3," and the ending video "ending" in chronological order, thereby generating the complete video.

The embodiment of FIG. 6 shows that "substitute video 1-5," "substitute video 2-5," and "substitute video 3-5" are each employed as the selected substitute video.

The video data output unit 18 outputs the "complete video data" to the cast terminal 30.

The method for outputting the "complete video data" may be, for example, data transmission of the "complete video data" to the cast terminal 30 or transmission of URL information of a website storing the "complete video data" to the cast terminal 30.

Video Editing Method

Next, the processing of the video editing program (a video editing method) executed in the video editing system S (the video editing apparatus 1) is described based on FIG. 10.

The above-described program according to an embodiment is a utility program aggregating various programs for implementing, as functional components of the video editing apparatus 1 including the storage unit 10, the storage unit 10, the attribute data acquisition unit 11, the mark data generation unit 12, the data transmission unit 13, the original confirmation unit 14, the video data acquisition unit 15, the video data selection unit 16, the video data generation unit 17, and the video data output unit 18, and the CPU of the video editing apparatus 1 executes this video processing program.

Note that the above-described program is, for example, executed in response to the operation of starting video editing from a management staff as a user.

A "video editing flow" illustrated in FIG. 10 starts from the step Si of acquiring, by the attribute data acquisition unit 11, the "cast attribute data" from the cast terminal 30.

Note that the acquired cast attribute data is sorted according to each cast and is stored in the storage unit 10.

Next, at a step S2, the mark data generation unit 12 generates the "identification mark data" with reference to the cast attribute indicated by the "cast attribute data."

Then, the data transmission unit 13 transmits the "identification mark data" to the cast terminal 30 (a step S3). At this point, the cast terminal 30 receives the "identification mark data" from the video editing apparatus 1, and the identification mark data is stored in the storage unit 31.

Next, at a step S4, the original confirmation unit 14 reads the identification mark displayed on the cast terminal 30 to confirm that the user of the cast terminal 30 is the cast oneself.

Specifically, the not-shown camera connected to the video editing apparatus 1 reads the identification mark, and the original confirmation unit 14 checks, from the cast identification contents included in the identification mark, whether or not the user is the cast oneself.

Next, at a step S5, the video data acquisition unit 15 acquires, from the shooting apparatus 20, multiple pieces of "original video data" linked to the cast attribute.

Note that the video linking unit 23 of the shooting apparatus 20 reads the identification mark indicated by the "identification mark data" in advance in shooing of the original video to link the cast attribute recorded in the identification mark and the original video to each other.

Next, at a step S6, the video data selection unit 16 selects, with reference to the cast attribute indicated by the "cast attribute data," the "substitute video data" in the predetermined shooting pattern from the multiple shooting patterns.

Specifically, as illustrated in FIG. 6, the video data selection unit 16 selects, for each shooting scene, the "substitute video data" in the shooting pattern corresponding to the cast attribute items.

Next, at a step S7, the video data generation unit 17 edits the original video indicated by the "original video data" and the substitute video indicated by the selected "substitute video data" in chronological order, thereby generating the "complete video data" indicating the complete video.

Specifically, as illustrated in FIG. 6, the video data generation unit 17 edits the "opening," the "original shooting scenes 1, 2," the selected "substitute shooting scenes 1, 2, 3," and the "ending" in chronological order, thereby generating the complete video.

Finally, at a step S8, the video data output unit 18 outputs the "complete video data" to the cast terminal 30.

The process of FIG. 10 ends through the steps 51 to S8 described above.

By the above-described flow of the processing of the video editing program, the video that the original acts like the character can be quickly provided in the experience-based service for the inbound visitor, and a workload on a service manager and a working cost of the service manager can be reduced.

Other Embodiments

In the above-described embodiment, as illustrated in FIGS. 6 to 9, the video editing system S edits the original video that the cast plays the "ninja" and the substitute video in chronological order to generate the complete video as the memorial moving image, but is not limited to the "ninja." Changes can be made to the video editing system S.

For example, as characters other than the "ninja," characters such as a "samurai" and a "prince (princess)," characters of "existing famous people," and "cartoon" characters may be employed.

Note that in a case where the cast plays a character such as the "ninja," it is preferable because parts of the cast other than the face are covered with the costume and part of the face is also covered with the costume. That is, the video can be finished with such a degree of completion that a third person cannot recognize that the substitute video has been utilized.

In the above-described embodiment, the video data selection unit 16 selects the substitute video data in the shooting pattern corresponding to the cast attribute items (the gender, the body type, the costume size, and the costume) from the multiple shooting patterns, but is not limited to the above-described attribute items. Changes can be made to the video data selection unit 16.

For example, the video data selection unit 16 may select the substitute video data based on one attribute item of the "gender," "body type," "costume size," or "costume" of the cast. Alternatively, the video data selection unit 16 may select the substitute video data based on the "nationality" and "age" of the cast or the information obtained from the "picture."

In the above-describe embodiment, the video editing program is stored in a recording medium readable by the video editing apparatus 1, and the video editing apparatus 1 reads and executes such a program to execute the processing. The recording medium readable by the video editing apparatus 1 as described herein is a magnetic disk, a magnet-optical disk, a CD-ROM, a DVD-ROM, a semiconductor memory, etc.

Alternatively, this video editing program may be delivered to a not-shown server terminal via a communication line, and the server terminal itself having received such a delivery may function as a video processing apparatus to execute the program. Alternatively, the cast terminal itself may function as the video processing apparatus.

Note that the above-described embodiments are provided merely as one example for the sake of easy understanding, and is not provided for any purpose of limitation. Changes and modifications can be made to described embodiments, including variations and equivalents thereof.

| TABLE OF REFERENCE NUMERALS | |
|---|---|
| S | Video editing system |
| 1 | Video editing apparatus |
| 10 | Storage unit |
| 11 | Attribute data acquisition unit |
| 12 | Mark data generation unit |
| 13 | Data transmission unit |
| 14 | Original confirmation unit |
| 15 | Video data acquisition unit |
| 16 | Video data selection unit |
| 17 | Video data generation unit |
| 18 | Video data output unit |
| 20 | Shooting apparatus |
| 21 | Storage unit |
| 22 | Video shooting unit |
| 23 | Video linking unit |
| 24 | Data transmission unit |
| 30 | Cast terminal |
| 31 | Storage unit |
| 32 | Data transmission unit |
| 33 | Data reception unit |
| 34 | Display unit |

What is claimed is:

1. A video editing system comprising:
a processor configured to edit multiple pieces of video including an original video in which a cast plays a character and a substitute video in which a substitute for the cast plays a same character as the character played by the cast in chronological order to generate a complete video; and
a memory that stores substitute video data indicating a pre-shot substitute video in multiple shooting patterns according to attribute items including a gender of the cast, a body type of the cast and a costume of the cast and according to shooting scenes, wherein the processor is configured to:
acquire cast attribute data indicating a cast attribute necessary for appearance of the cast from a cast terminal utilized by the cast;
generate, from the cast attribute indicated by the acquired cast attribute data, identification mark data indicating an identification mark for identifying the cast;
transmit the generated identification mark data to the cast terminal;
read the identification mark displayed on the cast terminal to confirm the cast; and
acquire original video data indicating the original video of the cast, by reading the identification mark indicated by the identification mark data in shooting of the original video to link the cast attribute recorded in the identification mark and the original video of the cast to each other, and acquiring multiple pieces of original video data linked to the cast attribute;
select the substitute video data of a shooting pattern from multiple shooting patterns based on the attribute items corresponding to the acquired cast attribute data of the cast and the shooting scene; and
edit the original video indicated by the original video data and the substitute video indicated by the selected substitute video data in chronological order by shooting the original video of the cast in multiple scenes to generate complete video data indicating the complete video,
the original video is a video of a shooting scene in which the character which the cast plays is seen and a face of the character is seen,
the substitute video is a video of a shooting scene in which the same character as the character played by the cast is seen and the face of the character is not seen, and
the processor is configured to edit the original video and the substitute video in chronological order to generate the complete video data in which the cast and the substitute for the cast play the same character; and
output the complete video data to the cast terminal.

2. The video editing system according to claim 1, further comprising a plurality of shooting apparatuses that includes the shooting apparatus, wherein
each of the plurality of shooting apparatuses is placed at each location where each shooting scene is shot in an experience-based facility.

3. A video editing method for editing multiple pieces of video in chronological order to generate a complete video by a computer, wherein the multiple pieces of video includes an original video in which a cast plays a character and a substitute video in which a substitute for the cast plays a same character as the character played by the cast, and wherein the computer stores substitute video data indicating a pre-shot substitute video in multiple shooting patterns according to attribute items including a gender of the cast, a body type of the cast and a costume of the cast and according to shooting scenes, the method comprising:

acquiring cast attribute data including a cast attribute necessary for appearance of the cast from a cast terminal utilized by the cast, generating, from the cast attribute indicated by the acquired cast attribute data, identification mark data indicating an identification mark for identifying the cast, transmitting the generated identification mark data to the cast terminal, reading the identification mark displayed on the cast terminal to confirm the cast, and acquiring original video data indicating the original video of the cast, by reading the identification mark indicated by the identification mark data in shooting of the original video to link the cast attribute recorded in the identification mark and the original video of the cast to each other, and acquiring multiple pieces of original video data linked to the cast attribute, selecting the substitute video data of a shooting pattern from the multiple shooting patterns based on the attribute items corresponding to the acquired cast attribute data of the cast and the shooting scene, editing the original video indicated by the original video data and the substitute video indicated by the selected substitute video data in chronological order by shooting the original video of the cast in multiple scenes to generate complete video data indicating the complete video, and outputting the complete video data to the cast terminal, wherein the original video is a video of a shooting scene in which the character which the cast plays is seen and a face of the character is seen, the substitute video is a video of a shooting scene in which the same character as the character played by the cast is seen and the face of the character is not seen, and the computer is configured to edit the original video and the substitute video in chronological order to generate the complete video data in which the cast and the substitute for the cast play the same character.

\* \* \* \* \*